Dec. 23, 1924.  1,520,342
H. E. GRABAU
STRAND FOR TIRE FABRIC AND METHOD OF MAKING SAME
Filed Sept. 21, 1921    3 Sheets-Sheet 1
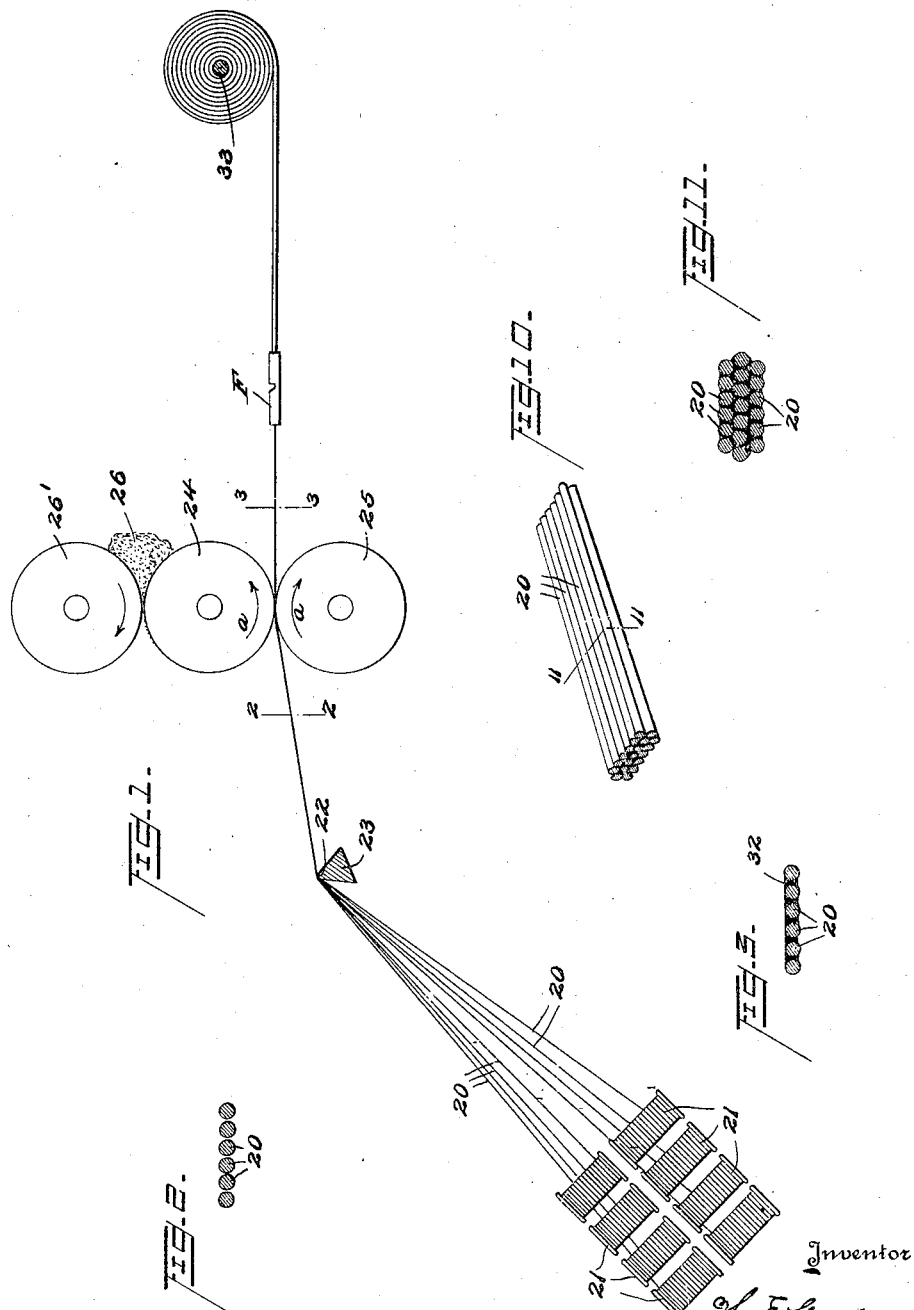

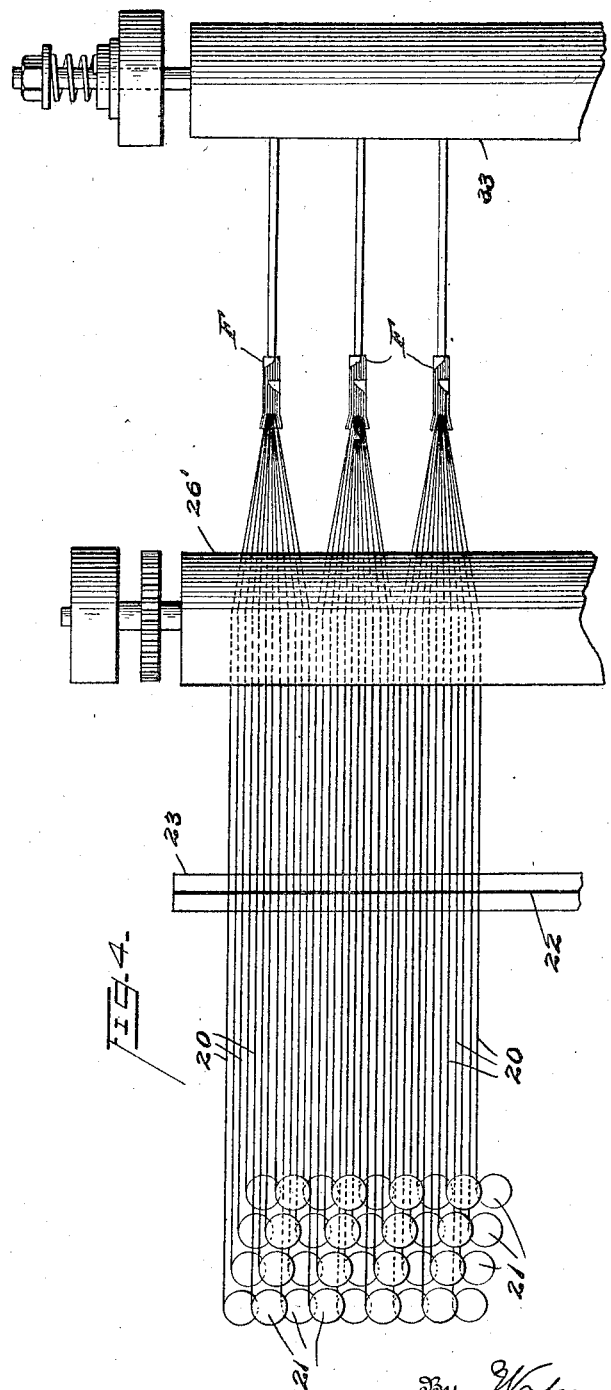

Dec. 23, 1924.  1,520,342
H. E. GRABAU
STRAND FOR TIRE FABRIC AND METHOD OF MAKING SAME
Filed Sept. 21, 1921   3 Sheets-Sheet 3
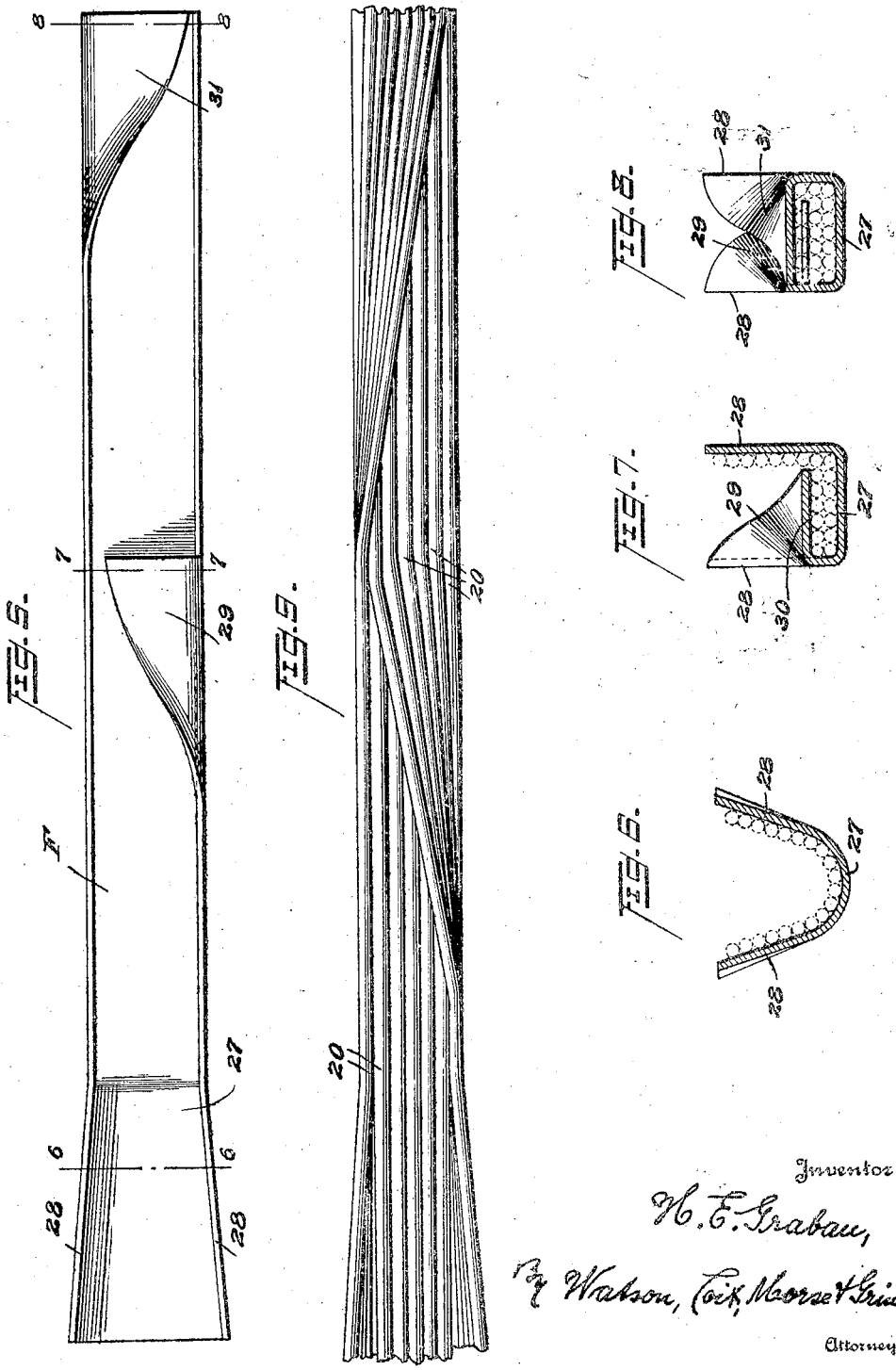

Patented Dec. 23, 1924.

1,520,342

UNITED STATES PATENT OFFICE.

HANS E. GRABAU, OF THROGS NECK, NEW YORK, ASSIGNOR, BY MESNE ASSIGNMENTS, TO MULTIPLE CORD CORPORATION, OF NEW YORK, N. Y., A CORPORATION OF DELAWARE.

STRAND FOR TIRE FABRIC AND METHOD OF MAKING SAME.

Application filed September 21, 1921. Serial No. 502,112.

*To all whom it may concern:*

Be it known that I, HANS E. GRABAU, a citizen of the United States, and residing at Throgs Neck, New York County, New York State, have invented certain new and useful Improvements in Strands for Tire Fabric and Methods of Making Same, of which the following is a specification.

The present invention relates to a method and apparatus for manufacturing strands or bundles of threads suitable for casings of pneumatic tires. Patent No. 1,227,426 and application, Serial No. 211,378, (now Patent No. 1,347,847) disclose a material for the layers of the carcass of pneumatic tires consisting of bundles or strands of threads connected by spaced relatively weak threads extending at an angle to the direction of the strands. Each of the bundles or strands comprises a plurality of threads disposed in superposed layers and preferably parallel and straight. It is desirable that the threads, cords, or fabric constituting the carcass of pneumatic tires should be coated or encased with rubber, primarily for the purpose of reducing internal friction in the carcass. According to said patent and application the rubber is applied to the layers or sheets of casing material after the same has been woven or made up.

In the production of the strand fabric disclosed in said patent, the spaced cross threads are the warps and the filling consists of the strands made up by passing the shuttle back and forth across the warp threads many times. The strand fabric disclosed in said application is made of warps consisting of strands or bundles of threads and filling comprising the spaced crossed threads. In either case it is found that the rubber applied to the fabric after it has been woven does not penetrate to the interior of the strands. As a result the interior threads of the strands are not rubberized and consequently are not protected against chafing, although there is little chafing between the threads of the strands in this type of fabric. If the individual threads constituting the strands are rubberized and then used as strands in the weaving of the fabric all the threads of the strands will be rubberized but the labor required to handle and place the threads in the fabric to form the strands renders this method impracticable. Furthermore, considerable space is required in order to properly handle the threads rubberized in this manner.

In my application 273,969 now Patent No. 1,509,202 I have disclosed a method for rubberizing the threads of the strands which consists in rubberizing the threads and arranging them in bundles while the adhesive is tacky thereby forming strands consisting of adhering threads. The threads are rubberized by passing them through a thin bath of dissolved rubber.

The present invention is directed to another method and apparatus for forming strands in which the interior threads are properly rubberized. Briefly stated, the present method consists in applying a coating of adhesive to one surface of a sheet of parallel threads and arranging said strands in superposed layers with the adhesive coated parts of the threads on the interior of the strand.

The objects and features of novelty will be apparent from the description taken in connection with the drawings in which:

Figure 1 is a diagrammatic view showing in side elevation an apparatus for carrying out the present method;

Figure 2 is a sectional view across the sheet of theads taken substantially on the line 2—2 of Figure 1;

Figure 3 is a similar sectional view after the coating of rubber has been applied to one surface of the sheet of threads;

Figure 4 is a diagrammatic view showing in plan the apparatus illustrated in Figure 1;

Figure 5 is a plan view of the device for grouping the threads in bundles or strands;

Figure 6 is a sectional elevation taken substantially on the line 6—6 of Figure 5;

Figure 7 is a sectional elevation taken substantially on the line 7—7 of Figure 5;

Figure 8 is a sectional elevation taken substantially on the line 8—8 of Figure 5;

Figure 9 is a plan view illustrating the manner of arranging the threads in bundles as they pass through the bundle making device;

Figure 10 is a perspective view of a strand or bundle of threads formed in accordance with the present method; and Figure 11 is a sectional elevation across the bundle taken substantially on the line 11—11 of Figure 10.

According to the present invention a plurality of threads are arranged in the form of a sheet preferably with the threads parallel and close together. To one surface of the sheet of threads the adhesive such as rubber is applied, preferably in the form of a thin coating or layer. Thereafter the threads are grouped into a strand or bundle, the rubber coated parts of the threads being disposed so as to face inward or be on the interior of the strand. In this manner the strand produced has no substantial amount of rubber on its exterior surface and consequently can be handled in weaving and at other times without any danger of sticking to other threads.

One form of apparatus for carrying out this method is illustrated diagrammatically in the drawings. Thus the threads 20 from the spools 21 disposed in any suitable manner are led up over the straight edge 22 of a bar or member 23 and thence between a pair of rollers 24, 25 which are connected by suitable means so as to rotate in the directions indicated by the arrows $a$. Carrying the threads over the edge 22 acts to separate them and bring them into position side by side in a single layer and in the form of a sheet, as clearly shown by Figure 2. The coating of rubber is applied to one surface of the sheet of threads as it passes between the rollers 24 and 25. For this purpose the supply of raw rubber 26 is fed between the rollers 24 and 26' and carried by the roller 24 and deposited on the upper surface of the sheet of threads. This type of rubber applying machine is usually known in the tire manufacturing art as a "skimming" machine. The sheet of threads coated on one surface with rubber is illustrated by the cross sectional view of Figure 3.

The next step consists in grouping a plurality of the threads in a bundle or strand with the rubber coated parts turned inwardly, that is on the interior of the bundle. Any suitable device may be used for this purpose. As shown in Figures 5 to 8 inclusive, one device for this purpose may be in the form of a folder F which is substantially trough-shaped comprising a bottom wall 27 and side walls 28. At the entering end, that is the left hand end as viewed in Figure 5, the walls 28 are flared out in order to properly guide the threads so that they pass from a group of threads in substantially sheet form to the positions illustrated in dotted lines in Figure 6. Intermediate its ends the folder is provided with a guiding element 29, the interior surface 30 of which joins the wall surface and extends adjacent to and spaced from the interior surface of the bottom wall 27, this guiding surface acting to move the threads at one side of the trough over against the threads lying on the bottom thereof, the positions being illustrated in Figure 7. In the form of folder shown the guiding element 29 may be formed by bending in a portion of the side wall. Spaced from the guiding element 29 is a similar but oppositely disposed guiding element 31 secured to the opposite side wall. The interior guiding surface of this element is adapted to carry the remaining threads over and against the bottom threads, thus disposing a plurality of threads in superposed contacting layers with the rubber coated surfaces on the interior of the bundle. The positions of the threads as they pass through the folder are further illustrated in Figure 9.

The form of strand produced by the folder described above is illustrated in Figures 10 and 11. It is to be understood however that the threads might be grouped into bundles or strands having a different cross sectional shape from that shown. It will be observed that the rubber layer or coating 32 applied by the skimming machine and illustrated in Figure 3 is on the interior of the bundle and that no rubber appears on the exterior surface of the bundle or strand. It follows therefore that the strands may be handled easily as they are not rendered sticky as would be the case if the exterior surface of the bundle were coated with rubber. After the strands have left the folder they may be wound up and stored on a roller 33, if desired.

Although the invention has been described in detail it is to be understood that it is not thus limited but includes modifications and changes which come within the scope of the appended claims.

Having thus described my invention what I claim as new and desire to secure by Letters Patent is:

1. The method of making strands comprising threads arranged in superposed layers consisting in applying a coating of adhesive to one surface of a sheet of parallel threads, and arranging said threads in superposed layers with the adhesive coated parts of the threads on the interior of the strand.

2. The method of making strands comprising threads arranged in superposed layers consisting in applying a coating of rubber to one surface of a sheet of parallel threads, and arranging said threads in superposed layers with the rubber coated parts of the threads on the interior of the strand.

3. The method of making strands comprising threads arranged in superposed layers consisting in applying a coating of rubber to one surface of a sheet of parallel threads, and while the rubber is adhesive, folding said sheet in a strand composed of a plurality of superposed layers with the rubber coated surface of the sheet on the interior thereof.

4. The method of making strands comprising threads arranged in superposed layers, consisting in arranging the threads parallel and side by side in the form of a sheet, coating one surface of said sheet of threads with raw rubber, and grouping said threads into a layered flat bundle held together by said rubber.

5. As an article of manufacture, a strand comprising a plurality of threads arranged in superposed layers, and an adhesive holding said threads together disposed only on the portions of the thread on the interior of the strand.

6. As an article of manufacture, a strand comprising a plurality of threads arranged in superposed layers, and rubber holding said threads together disposed only on the portions of the threads on the interior of the strand.

In testimony whereof I hereunto affix my signature.

HANS E. GRABAU.